United States Patent
Bertino

(10) Patent No.: US 10,086,738 B2
(45) Date of Patent: Oct. 2, 2018

(54) TRANSSHIPMENT IMPLEMENT FOR AGRICULTURAL PRODUCTS

(71) Applicant: Indústrias Reunidas Colombo Ltda., Pindorama (BR)

(72) Inventor: Luiz Henrique Bertino, Pindorama (BR)

(73) Assignee: INDÚSTRIAS REUNIDAS COLOMBO LTDA., Pindorama (BR)

( * ) Notice: Subject to any disclaimer, the term of this patent is extended or adjusted under 35 U.S.C. 154(b) by 162 days.

(21) Appl. No.: 15/366,639

(22) Filed: Dec. 1, 2016

(65) Prior Publication Data

US 2017/0156267 A1     Jun. 8, 2017

(30) Foreign Application Priority Data

Dec. 4, 2015 (BR) .............................. 102015030476

(51) Int. Cl.
  *B60P 1/16* (2006.01)
  *A01D 90/10* (2006.01)
  *B62D 63/06* (2006.01)

(52) U.S. Cl.
  CPC .............. *B60P 1/165* (2013.01); *A01D 90/10* (2013.01); *A01D 90/105* (2013.01); *B62D 63/064* (2013.01)

(58) Field of Classification Search
  CPC .. B60P 1/04; B60P 1/165; B60P 1/283; B60P 1/286; B60P 1/36; B60P 1/38; B60P 1/48; B60P 1/56; B60P 1/162; B65F 2003/025; B62D 63/064; A01D 90/10; A01D 90/105; A01D 90/12; A01D 57/16; A01D 57/20; A01D 17/02; A01D 17/04
  See application file for complete search history.

(56) References Cited

U.S. PATENT DOCUMENTS

| | | | | |
|---|---|---|---|---|
| 4,382,631 | A * | 5/1983 | Johnson | A01D 90/105 280/764.1 |
| 5,338,140 | A * | 8/1994 | Ekdahl | B60P 1/34 298/11 |
| 9,789,798 | B2 * | 10/2017 | Torrison | B60P 1/38 |
| 2011/0002762 | A1 * | 1/2011 | Horan | B60P 1/165 414/470 |

* cited by examiner

*Primary Examiner* — Glenn F Myers
(74) *Attorney, Agent, or Firm* — B. Aaron Schulman, Esq.; Stites & Harbison, PLLC

(57) ABSTRACT

A transshipment implement for agricultural products, comprising a wheeled cart of the kind towable by a tractor; a complementary structure assembled over the cart; a dumper supported over the cart which has the ends of the upper edge of one of its side walls hinged to the corresponding points of the complementary structure, wherein it is tilted at an angle slightly greater than 90°; and an unloading and cleaning transshipment belt with an edge hinged in adjacent alignment to the same hinging edge of the dumper. The transshipment belt moves from a vertical position to a horizontal position, wherein, in the first position, the belt remains juxtaposed to the corresponding wall of the dumper, being embedded for the transport of the implement, while the second position is an unloading position for movement of the product received in the dumper to another receptacle, such as the compartment of a larger transportation vehicle.

5 Claims, 20 Drawing Sheets

TRANSSHIPMENT IMPLEMENT FOR AGRICULTURAL PRODUCTS

FIELD OF THE INVENTION

The present invention relates generally to implements used in agricultural harvesting and shipping, and in particular to an implement that may be used for the transshipment of agricultural products from the field to other locations.

BACKGROUND OF THE INVENTION

Implements used in the movement of agricultural products are well known in the prior art. It is also well known that there are a large variety of agricultural products planted under different terrain conditions which, besides the conditions potentially being uneven, may also present space limitations. These and other issues commonly make the movement of postharvest products difficult, especially those products existing in the form of pods, legumes and grains, such as peanuts. Ideally in such examples, the harvested products can be moved through the field by an implement that provides a quick and versatile means of transportation that is able to be used on a wide range of terrains, including in narrow spaces between plantation rows. It is also desirable for the implement to be capable of and efficient for transshipment to another, larger means of transportation.

Currently, there are a wide variety of available implements for this purpose which, despite being constructed to speed up product movement between various places, do not offer an efficient means for quick displacement of product and a cleaning stage through a sieving system.

Therefore, what is needed is an implement which is able to quickly and efficiently move agricultural products 'in the field', under a variety of terrain conditions, to a secondary means of transportation, with the implement also providing a basic cleaning function through the removal, by sieving, of extraneous or residual materials such as soil.

SUMMARY OF THE INVENTION

The present invention refers to an implement specially designed to move different agricultural products, mainly from postharvest, in the form of pods, legumes and grains, e.g. peanuts. The implement is of the kind used in the field and, consequently, includes all the required details to be towed by a tractor that includes a hydraulic pump. In addition to a wheeled cart and a quick engaging lance, the implement of the present invention also includes a dumper with a special configuration defined by the dumper being, substantially higher on one side than the other, and having a drainage edge connected to a short transshipment belt. The implement also has an independent hydraulic dumping tool.

The implement of the present invention may be used as a rapid means of transportation for agricultural products, such as peanuts, with the product being harvested in the field and loaded onto the dumper. The product subsequently may be easily moved to another place and reloaded, e.g. on another, larger vehicle for further transportation.

At such a time, unloading is performed quickly and easily, as the hydraulic system of the implement allows the transshipment belt to be positioned horizontally, thus allowing the dumper to be tilted and to pour the entire product load over the belt, which then transports the material to the discharge point which, as previously stated, may be a receptacle such as the compartment of another larger vehicle. During unloading, the transshipment belt also functions as a sieve, removing any leftover unwanted residual materials, such as earth remaining from the harvest.

In consideration of the circumstances described above, the transshipment implement of the present invention has been developed and designed to provide quick and efficient transshipment of various agricultural products, e.g. peanuts. The implement of the present invention includes:

a compact wheeled cart with a simple chassis, defined by two longitudinal beams and two crosspieces. The chassis has the capacity for two different positions over an axle with two wheels, thus allowing one to choose the desired center of gravity so that the engaging lance may be assembled at any one of the edges of the chassis, which allows one to select for unloading by the left or the right side of the cart;

assembled over the chassis is a dumper possessing a hydraulic cylinder system that is activated by the hydraulic pump of a tractor;

the dumper is able to tilt to its right hand or left hand side, with the unloading side being substantially higher than the opposing side the flowing edge of the dumper is connected to a transshipment belt with a cylinder-activated system and hydraulic motors similar to and activated by the hydraulic pump of a given tractor;

the transshipment belt has two hydraulic systems, wherein the first system is a set of hydraulic cylinders for movement of the belt at an angle, allowing for the belt to be placed in different angled positions ranging from a vertical position to a horizontal position, so as to allow the belt to be kept retracted and vertical while not unloading, or in a horizontal unloading position, with the belt in the unloading position forming a bridge between the dumper and the place of unloading or receptacle, e.g. the compartment of another, larger transportation vehicle;

the transshipment belt speeds up the process of product unloading and, concomitantly performs a cleaning function, by functioning as a sieve to remove residual unwanted material or particles, such as earth;

the transshipment belt also allows for the uniform distribution of product during unloading; and the dumper has additionally been developed to speed up the process of product unloading, i.e., after positioning the belt next to the desired product receptacle, the dumper is tilted to allow all of the product material to fall onto the belt, and the bridge thus formed allows residual material or particles smaller than the product, e.g. earth, to drop into the gap between the dumper and the product receptacle for.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
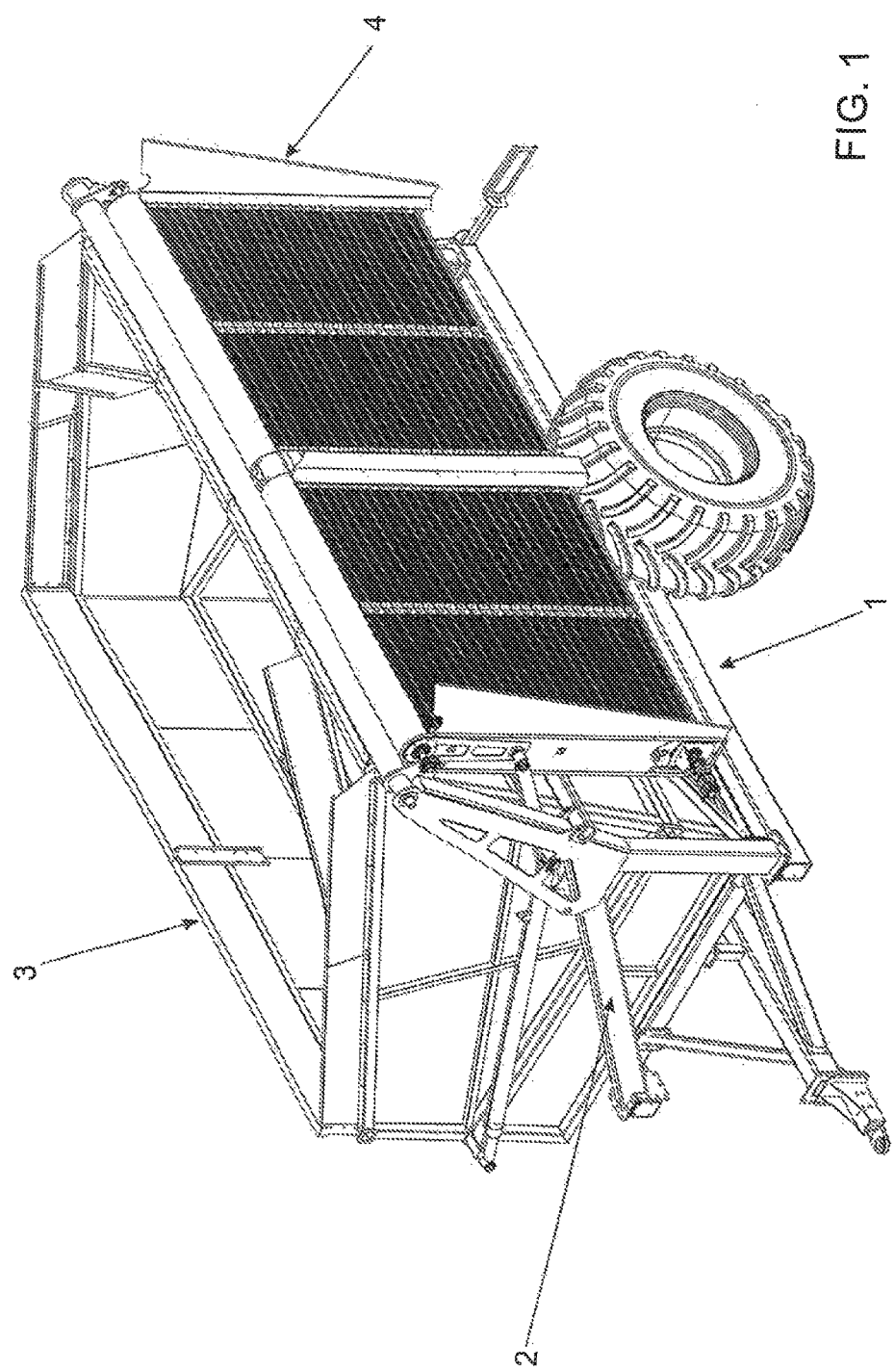
FIG. 1 shows an upper perspective view of the implement at an upper front angle, showing the transshipment implement and highlighting its left side, showing the transshipment belt in its retracted vertical position.

As can be seen in FIG. 1, the transshipment implement has a wheeled cart (1), a complementary structure (2) assembled over the cart (1), a dumper (3) supported over the cart (1) and having the tips of the upper edge of one of its side walls hinged to the corresponding points of the complementary structure (2), and a cleaning and unloading transshipment belt (4) with one end hinged in alignment to the same hinging edge of the dumper (3).

Figure 2:
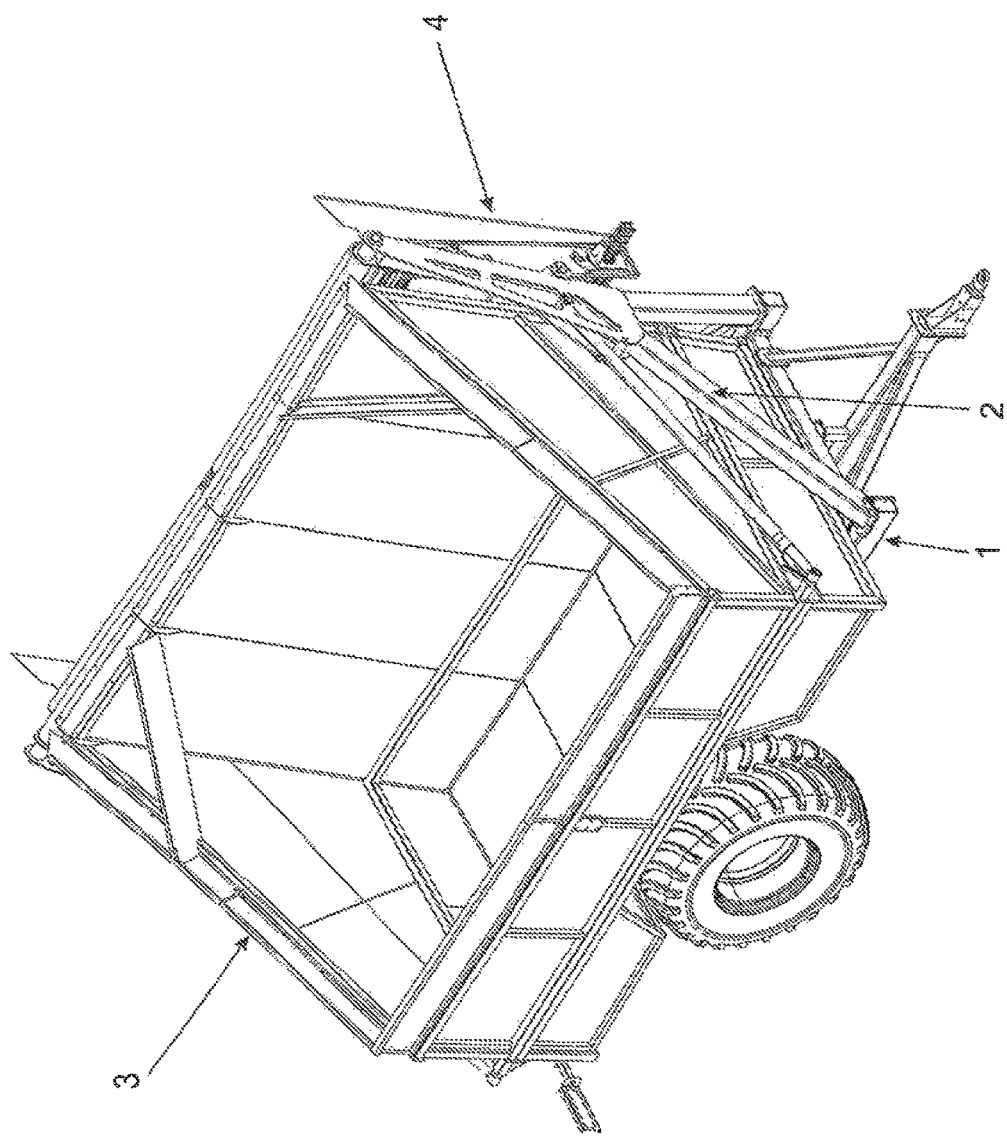
FIG. 2 shows another upper perspective front view, highlighting the right side of the implement and consequently the fact that the right side of the dumper in this depicted embodiment is significantly lower than the left side.
Figure 3:
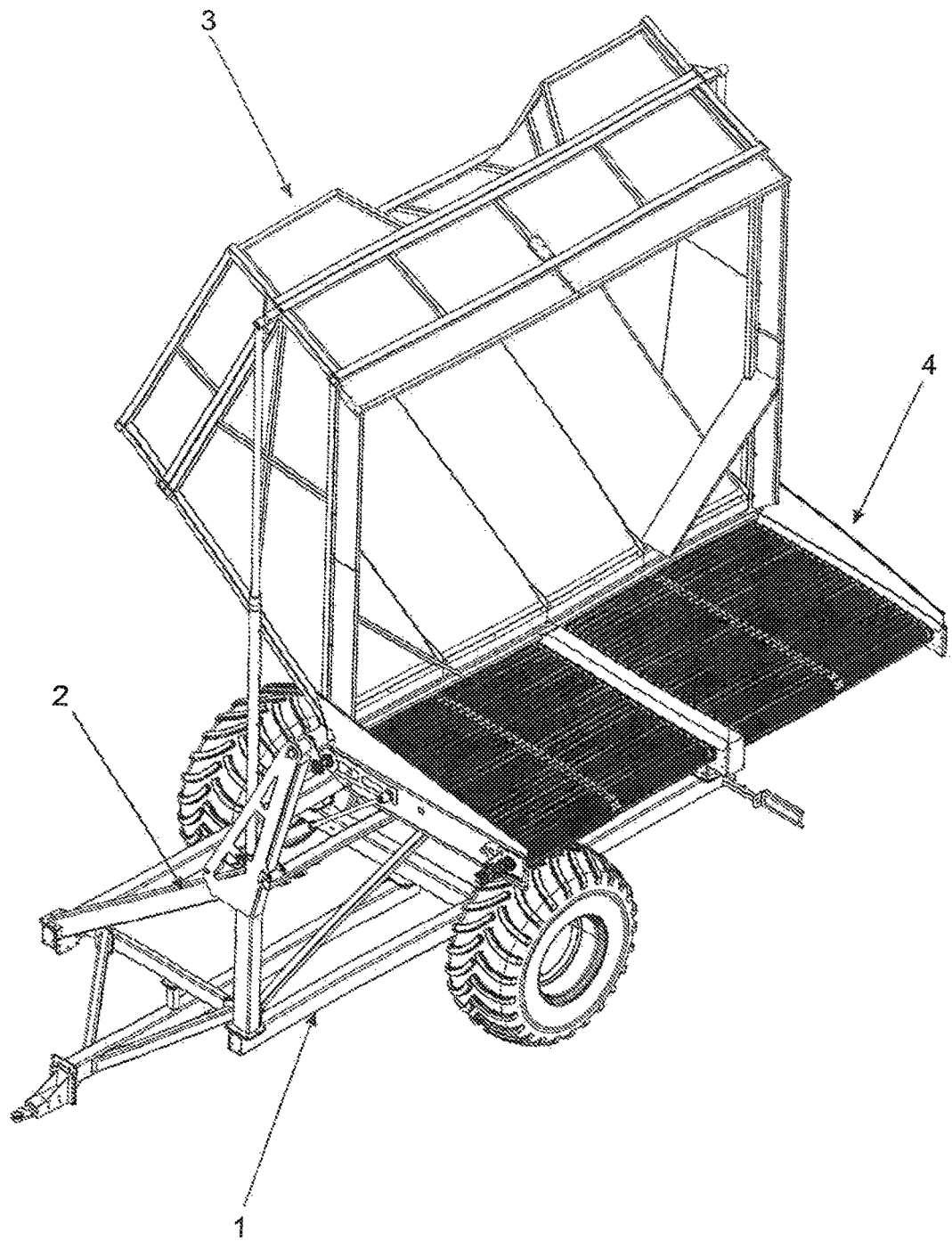
FIG. 3 shows a perspective view from an upper front angle, highlighting the left side of the implement and illustrating the dumper and the transshipment belt in an unloading position.
Figure 4:
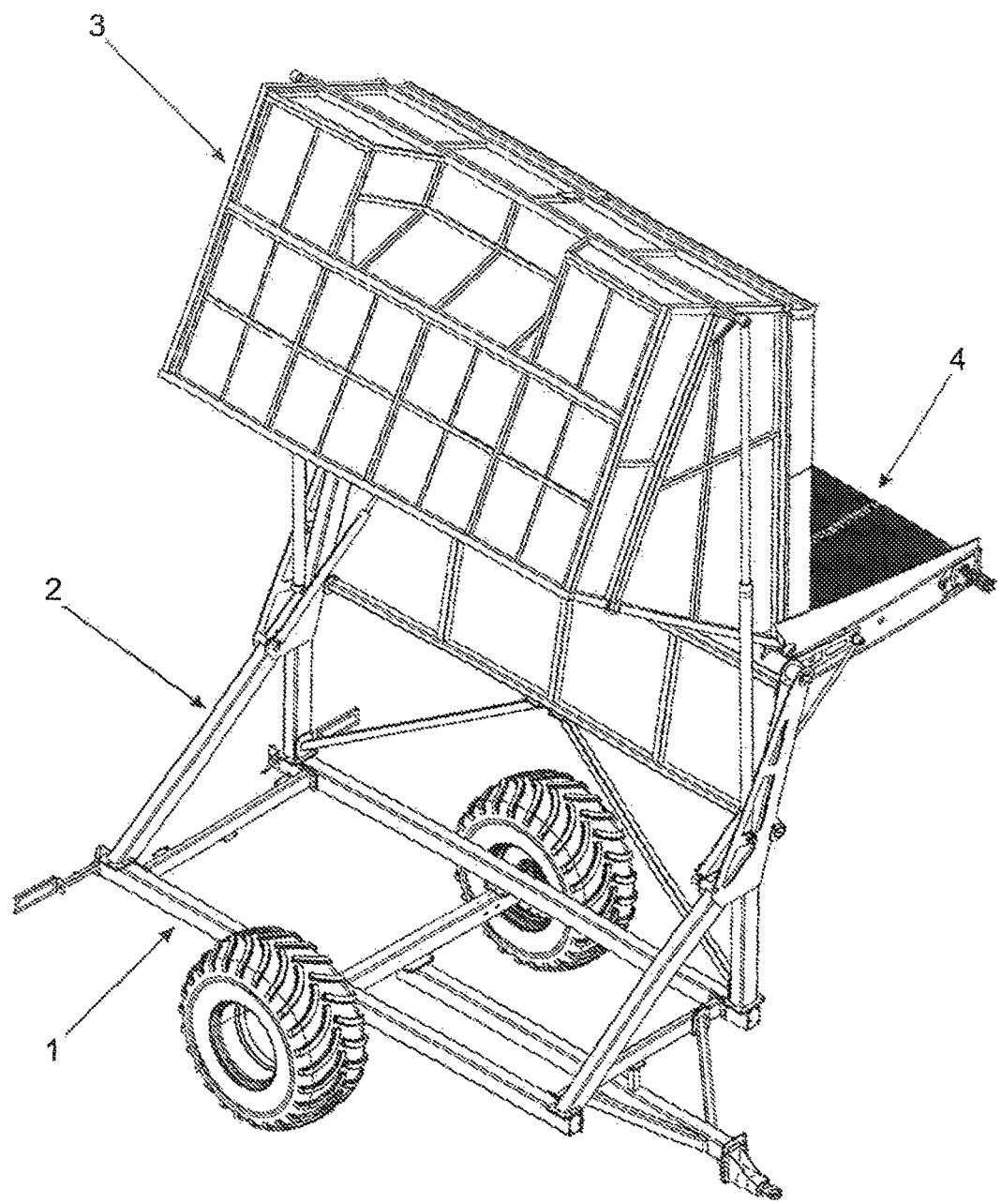
FIG. 4 also shows a perspective view from an upper front angle from the opposite side as FIG. 3, and also shows the dumper and the transshipment belt in an unloading position.

In FIG. 2 it is possible to see that the right side of the dumper (3) in the depicted embodiment is significantly lower than the left side.

As illustrated in FIGS. 1-4, the dumper (3) tilts according to an angle which is larger than 90°, when it is moved from a vertical position to a horizontal position, wherein, in the first position, the transshipment belt remains attached to the corresponding wall of the dumper (3), being embedded for transportation of the implement, while the second one constitutes an unloading position.

Figure 5:
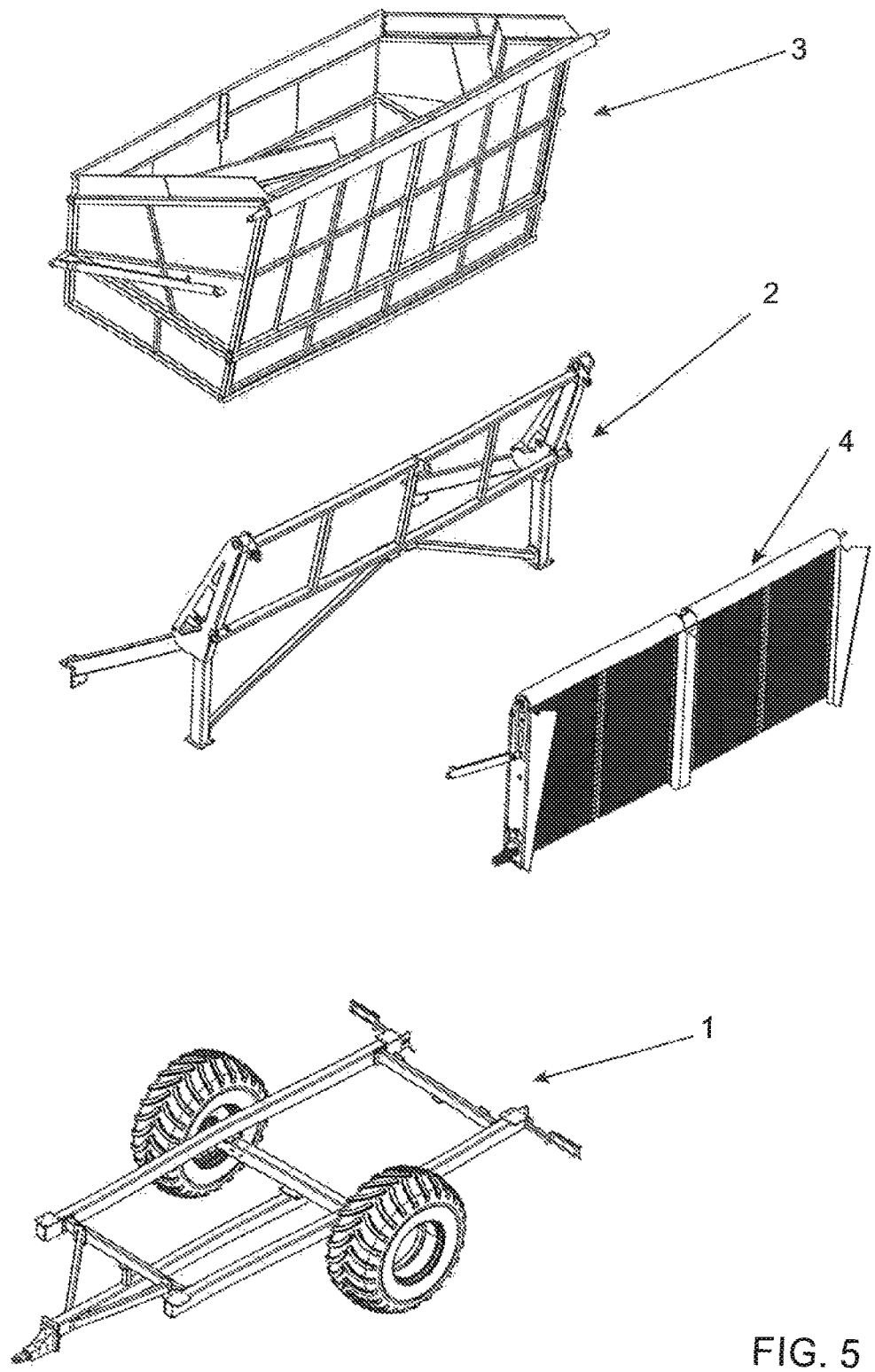
FIG. 5 shows an exploded perspective view of the transshipment implement showing the separated elements including; the wheeled cart, the complementary structure, the dumper and the transshipment belt.
Figure 6:
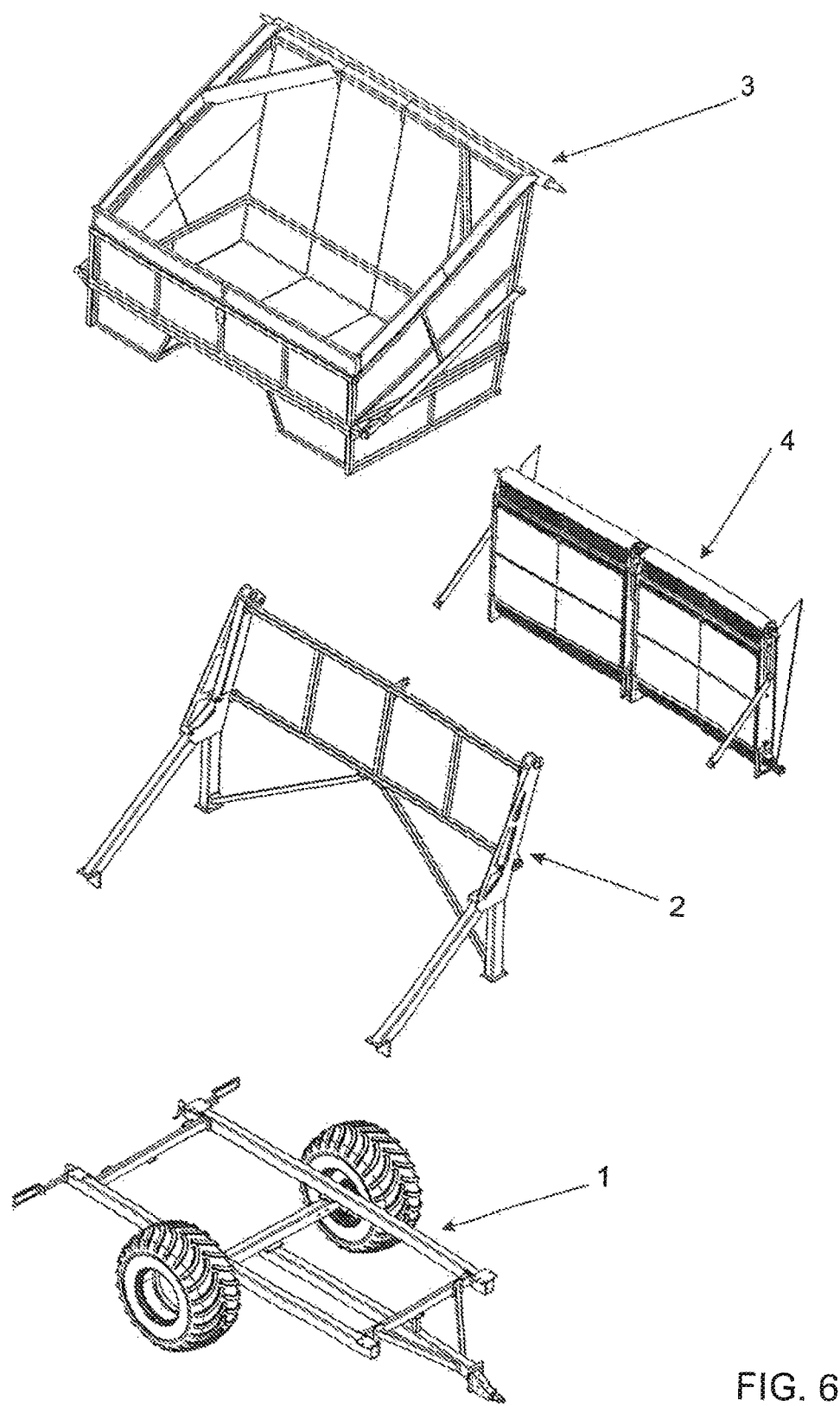
FIG. 6 shows the same view as FIG. 5, but from the opposite side.

The separated elements of the transshipment implement are illustrated from an exploded perspective view in FIGS. 5 and 6, including; the wheeled cart (1), the complementary structure (2), the dumper (3) and the transshipment belt (4).

Figure 7:
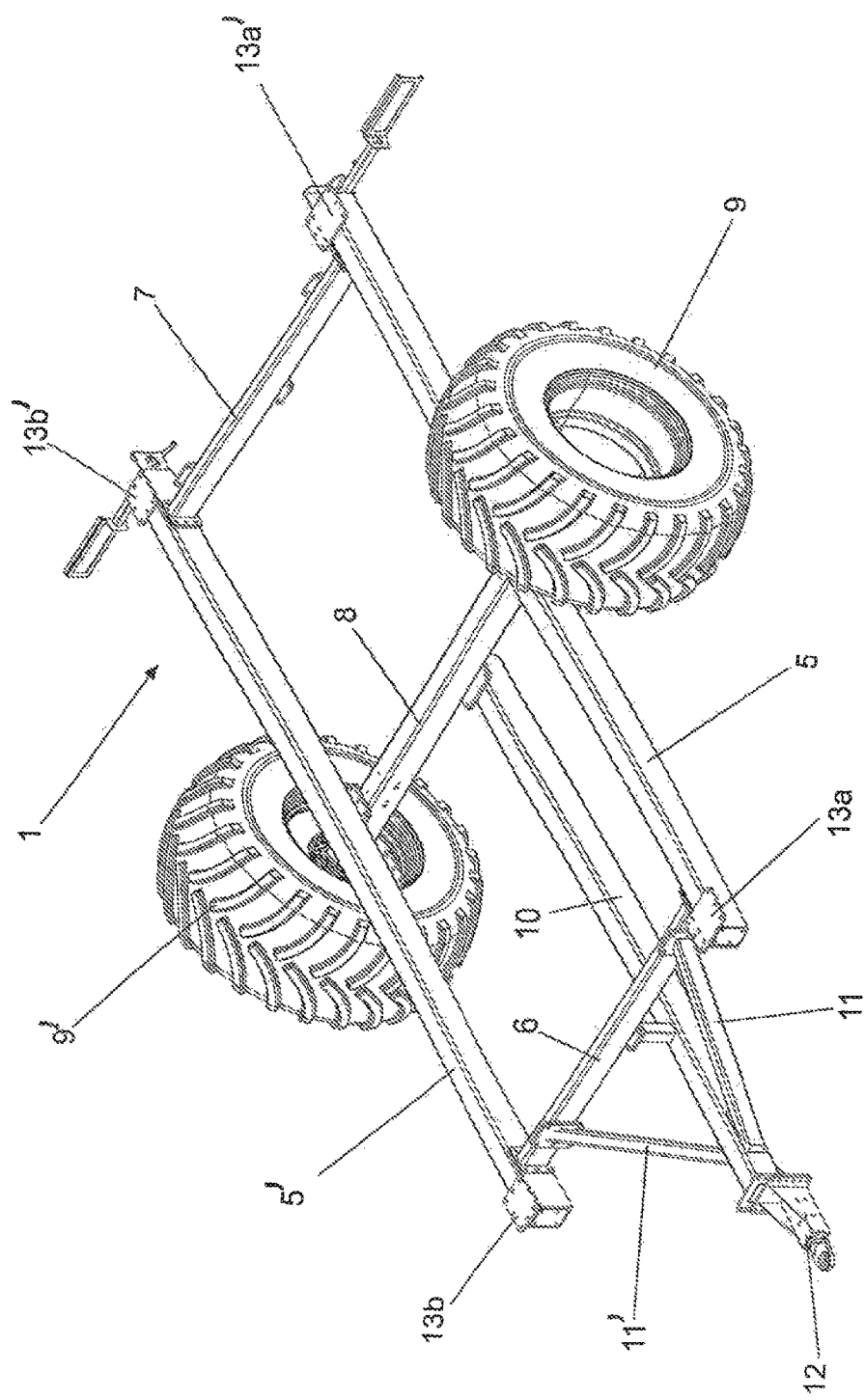
FIG. 7 shows a magnified perspective view of the wheeled cart.
Figure 8:
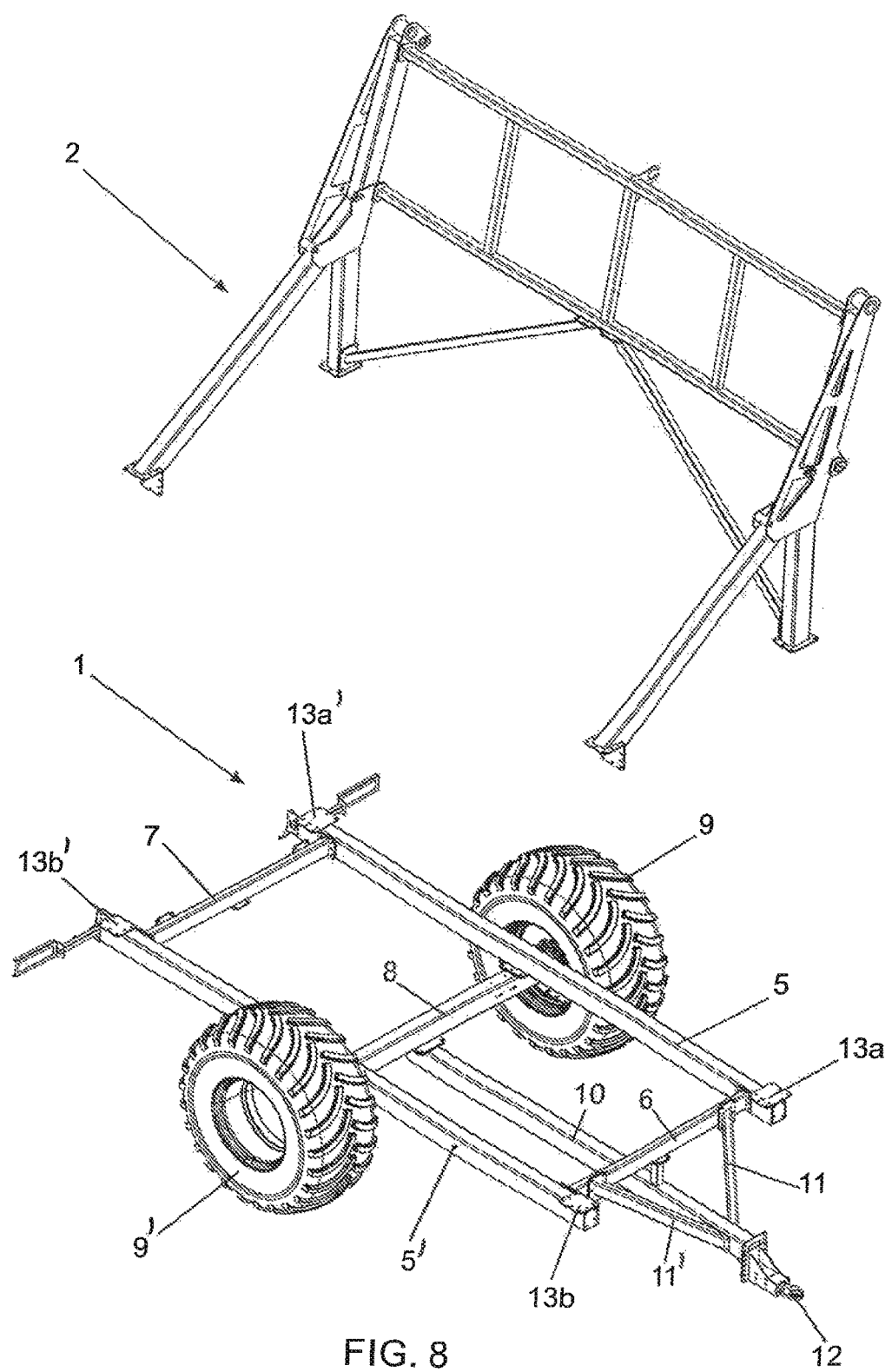
FIG. 8 shows magnified perspective views of the cart and the complementary structure.
Figure 9:
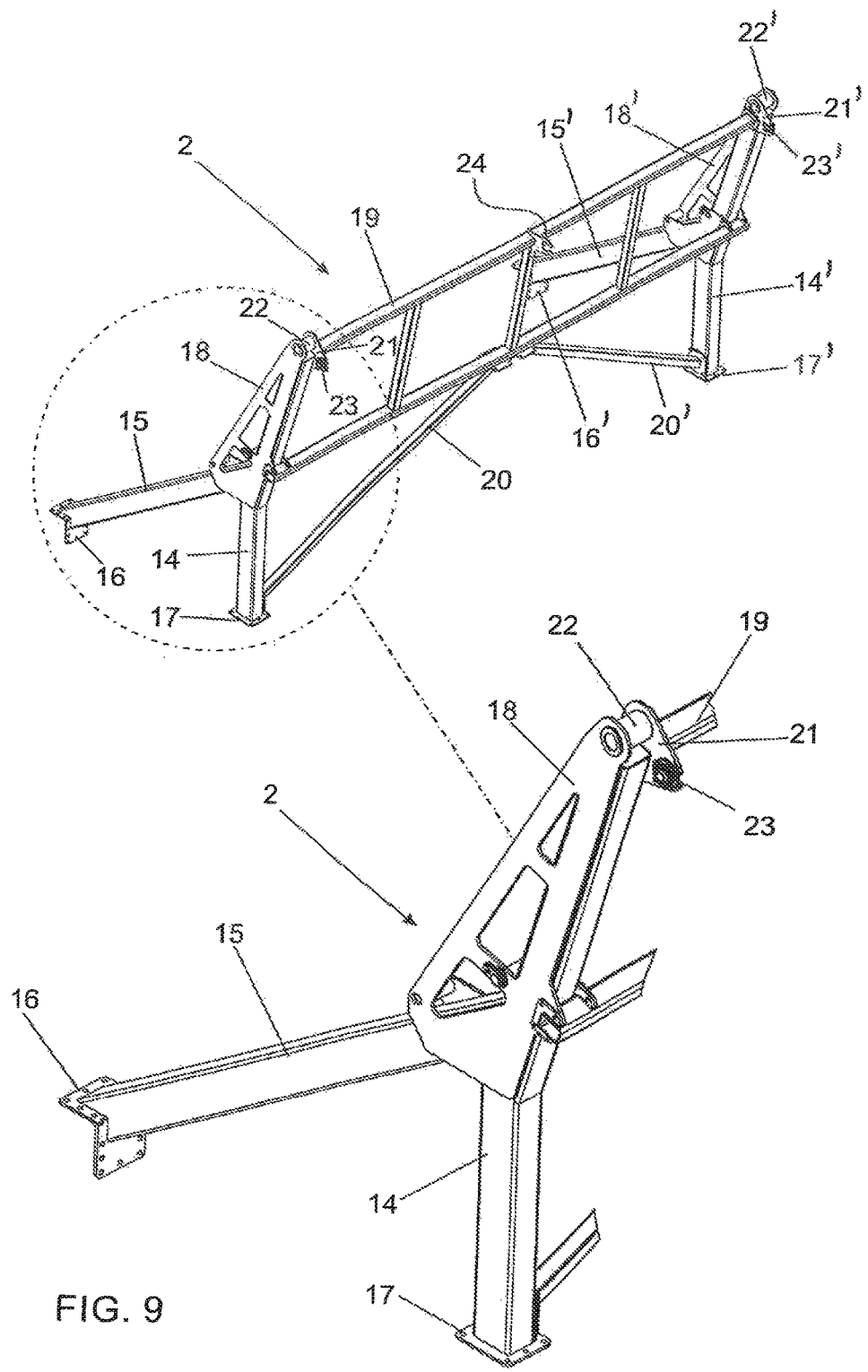
FIG. 9 shows magnified perspective views of the complementary structure as it is assembled over the cart.

As seen in FIG. 7 the wheeled cart (1) includes a left side longitudinal beam (5) and a right side longitudinal beam (5'), the beams having their ends connected by front (6) and rear (7) crosspieces, with a axle (8) between them connected to the left wheel (9) and right wheel (9'), respectively, and a third middle longitudinal beam (10) with its end edge fixed over the middle part of the axle (8), while the front edge is fixed to the middle part of the front crosspiece (6), after which the longitudinal beam forms an edge with left (11) and right assembling reinforcements (11') for the engaging and towing lance (12). There are four supports, including a left front support (13a), right front support (13b), left rear support (13a') and right rear support (13b') included over the corresponding front and rear edges of the side longitudinal beams (5a) and (5b), in order to give support to the corresponding parts of the complementary structure (2).

In FIGS. 8, 9, 10 and 11 the complementary structure (2) is assembled over the wheeled cart (1), showing that the complementary structure (2) has the configuration of an inverted Y shape when viewed from the front or rear and is defined by four legs, including front and rear vertical legs (14) and (14'), and front and rear inclined legs (15) and (15'). The front and rear inclined legs (15) and (15') have corresponding front and rear feet (16) and (16') attached at an angle on their ends. The feet (16) and (16') of the two inclined legs (15) and (15') are fixed over the corresponding right front and right rear supports (13b) and (13b') of the cart (1), while the two vertical legs (14) and (14') are also attached to corresponding front and rear feet (17) and (17') for the fixation of the complementary structure (2) to the left front and rear cart supports (13a) and (13a').

The two front legs (14) and (15) and the two rear legs (14') and (15') are also joined by their upper edges through front and rear triangular plates (18) and (18'), and between the two joined pairs of legs is assembled a grid with an upper portion that is tilted outwards (19). The lower part of the grid (19) includes front and rear struts (20) and (20'), while, on the upper part, its edges are complemented by front and rear plates (21) and (21'), so that a front hinging support shaft (22) and front bearing (23) and a rear hinging support shaft (22') and rear bearing 23(') may be located at the front and rear ends of the grid, which, jointly with a central middle bearing (24), form hinging supports for the dumper (3) and the unloading and cleaning transshipment belt (4).

Figure 10:
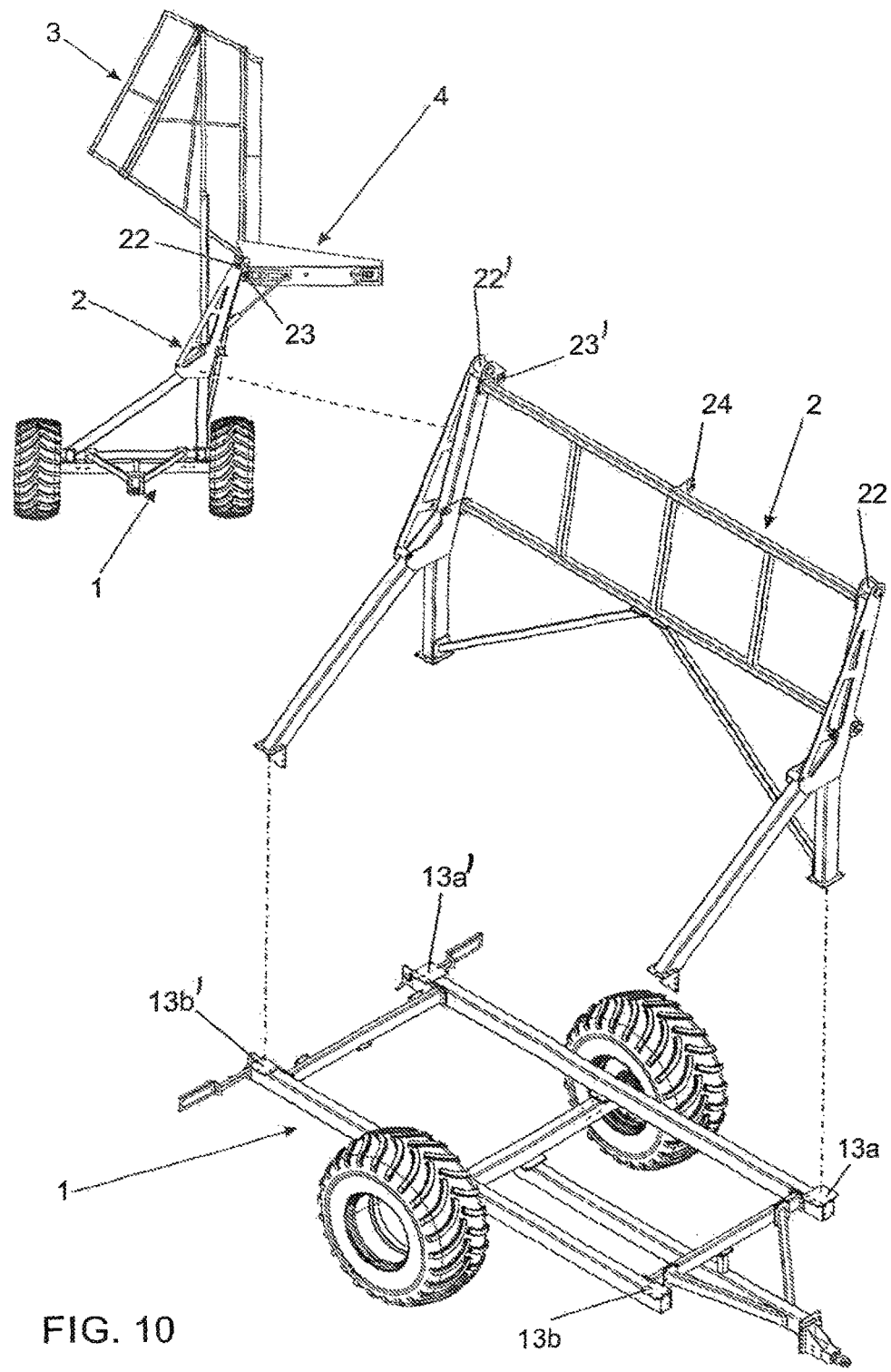
FIG. 10 shows a front view of the implement in an unloading position, and an exploded perspective view over the right angle of the cart and the complementary structure.

In FIG. 10, it is possible to see the transshipment implement in an unloading position, and an exploded perspective view over the right angle of the cart (1) and the basic complementary structure (2).

Figure 11:
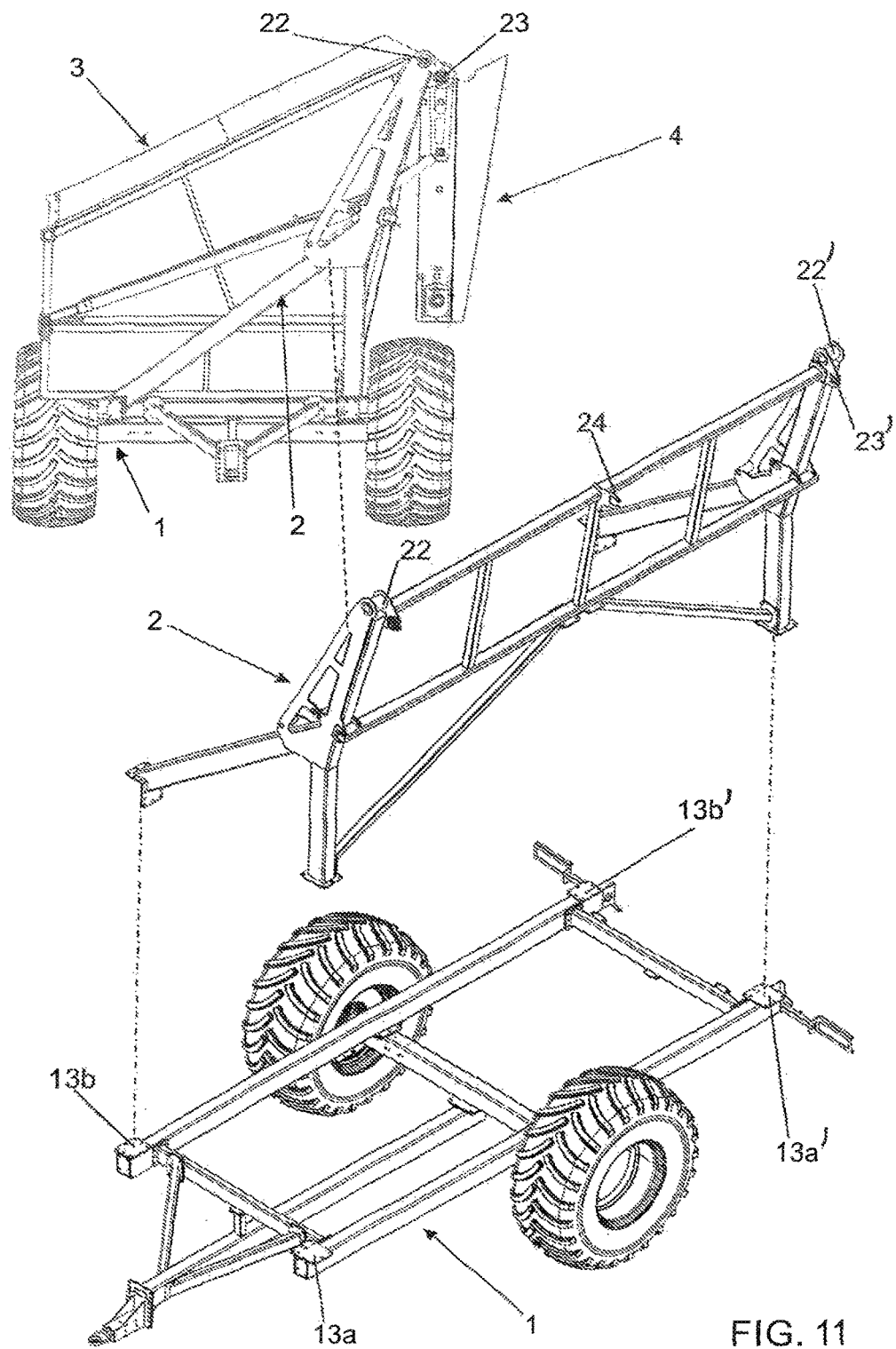
FIG. 11 shows a front view of the implement in a resting position, and an exploded perspective view over the left angle, of the cart and the complementary structure.

In FIG. 11 a front view of the transshipment implement in a resting position is seen over the left angle of the cart (1) with the basic complementary structure (2).

Figure 12:
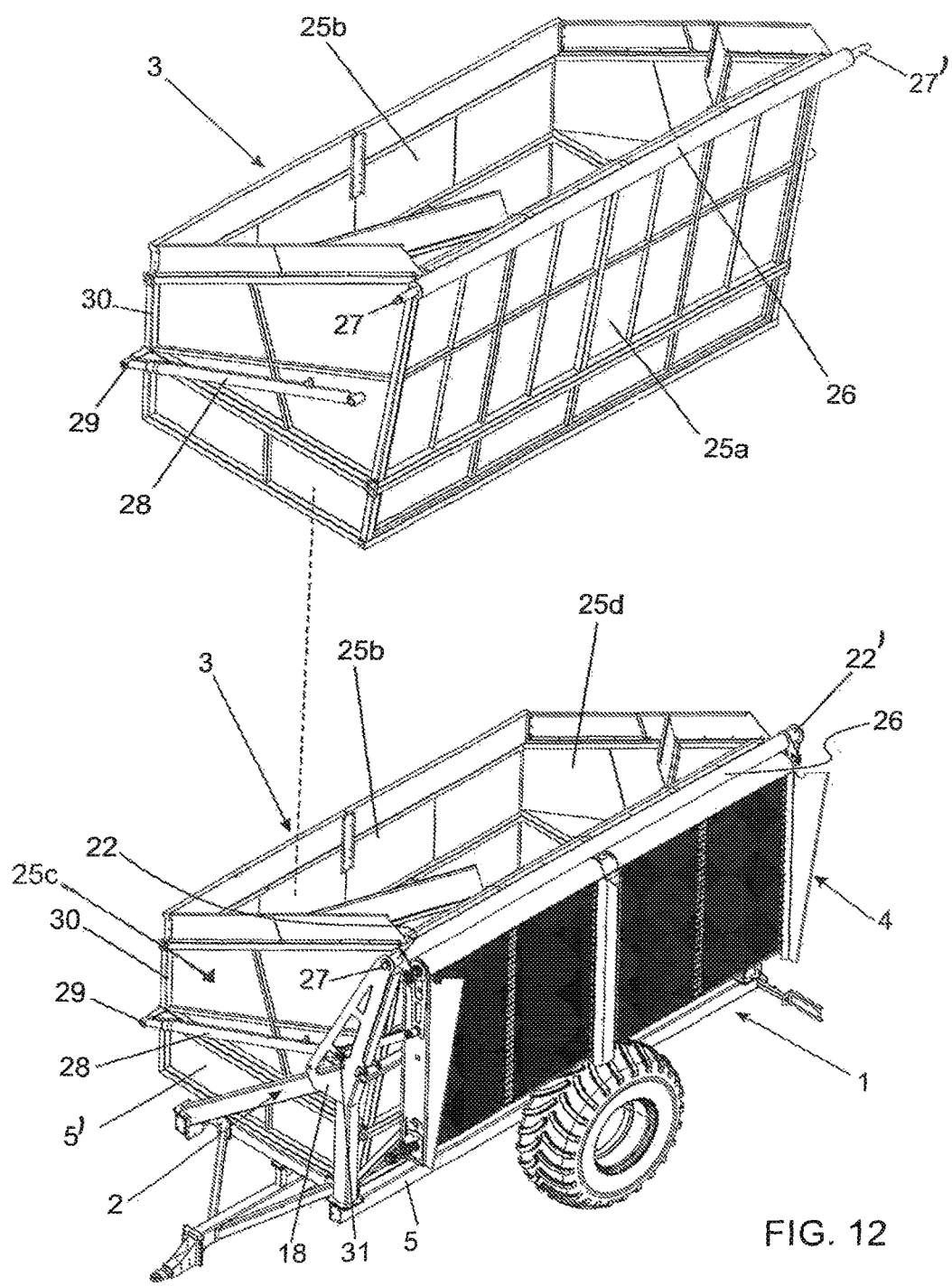
FIG. 12 shows a magnified perspective view of the dumper showing its higher side, and a perspective view of the implement with the dumper and transshipment belt retracted.
Figure 13:
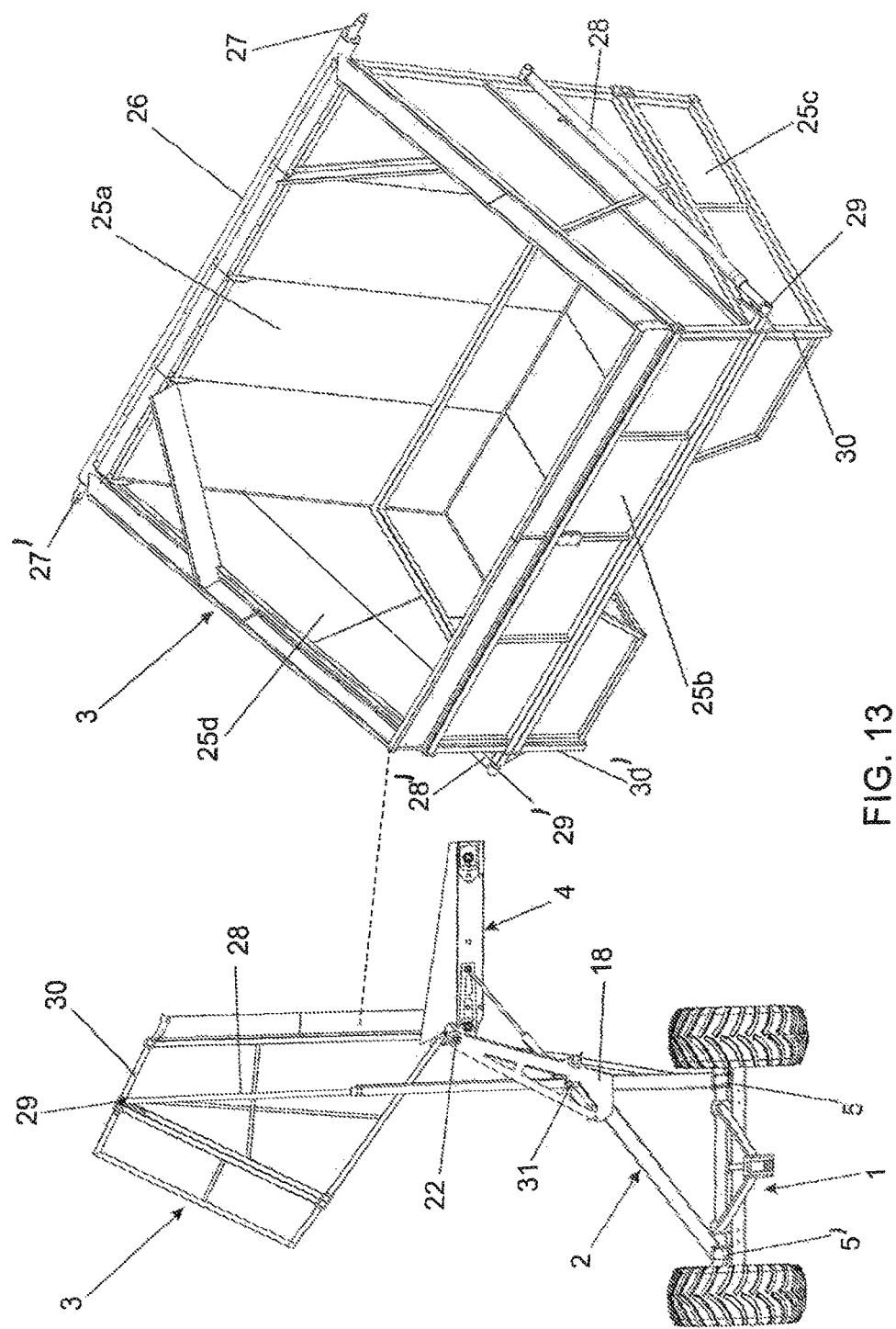
FIG. 13 shows a front view with the dumper and transshipment belt in an unloading position, and a magnified perspective view of the dumper showing its lower side.

In FIGS. 12 and 13 it can be seen that the dumper (3) has four walls, a front wall (25c), a rear wall (25d), a higher side wall (25a) and a lower side wall (25b). In FIG. 12 it can be seen that a key characteristic of the dumper (3) is the fact that one of its side walls (25a) is both slightly tilted towards the outside, and is substantially higher than the side wall of the opposite side (25b) which is completely vertical. In addition, higher side wall (25a) and lower side wall (25b) both have their edges or bases in a lengthwise alignment over the corresponding left side and right side longitudinal beams (5) and (5') of the cart (1). The upper edge of the tilted, higher side wall (25a) includes a tubular finishing piece (26) with front and rear exposed edge sections (27) and (27') fittable to the corresponding front and rear hinging support shafts of the complementary structure (22) and (22'), with these points servings as the tilting points of the dumper (3), over which the front (25c) and rear (25d) walls, and front and rear hydraulic cylinders (28) and (28') are assembled. The front hydraulic cylinder (28) has a corresponding front hinged edge (29) over the front vertical riser (30) of the lower side wall (25b), while its opposite end is equally coupled at a front hinge point (31) assembled between the corresponding front triangular plate (18) of the complementary structure (2). The rear hydraulic cylinder (28') also has a corresponding rear hinged edge (29') over the rear vertical riser (30') of the lower side wall (25b), with its opposite end equally coupled at a rear hinge point (not shown) assembled between the corresponding rear triangular plate (18') of the complementary structure (2).

The hydraulic cylinders (28) and (28') are also interconnected by hoses (not shown), to the hydraulic pump circuit of a tractor (not shown). The activation of the hydraulic cylinders (28) and (28') thus allows the dumper (3) to tilt by tilting around the corresponding exposed edge sections (27) and (27') supported by the hinging support shafts (22) and (22') of the complementary structure (2).

Figure 15:
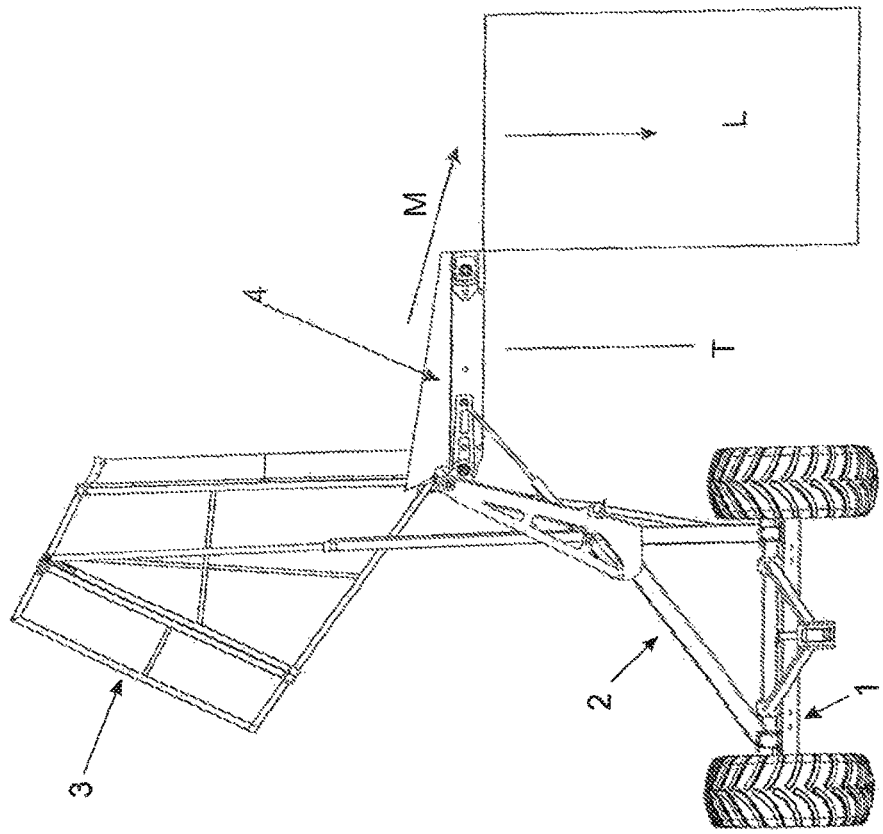
FIG. 15 shows a front view with the dumper and transshipment belt in an unloading position, schematically illustrating the product flowing towards a receptacle inside of another vehicle for grain transportation.
Figure 14:
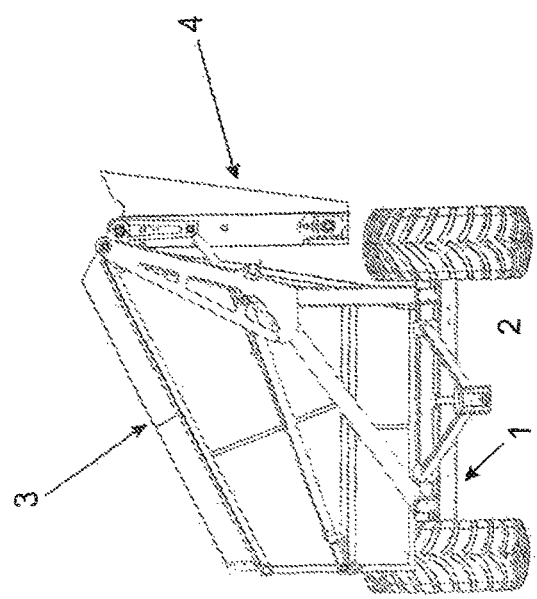
FIG. 14 shows a front view of the implement with a retracted dumper and transshipment belt.

In FIGS. 14 and 15 is shown the cleaning and unloading transshipment belt (4), which is hinged in alignment with the same hinging edge of the dumper (3). As previously stated, the transshipment belt is able to assume different positions, and can be adjusted from a vertical to a horizontal position.

In FIG. 14 one is also able to see the transshipment implement with a retracted dumper and transshipment belt, with the belt in a vertical, resting position, used when the cart (2) is being moved from one place to another.

In FIG. 15 the transshipment implement with the dumper (3) and transshipment belt (4) in an unloading position is seen, and also a schematic illustration of the agricultural product (M) flowing towards a receptacle (L) inside of another vehicle for product transportation. The horizontal position of the transshipment belt defines the moment of unloading the material (M) from the dumper to another place (L) and, concomitantly. While the product (M) is unloading, a cleaning function is performed which allows the removal of residual material such as earth (T), as smaller particles of material fall directly to the ground between the transshipment belt and the receptacle (L).

Figure 16:
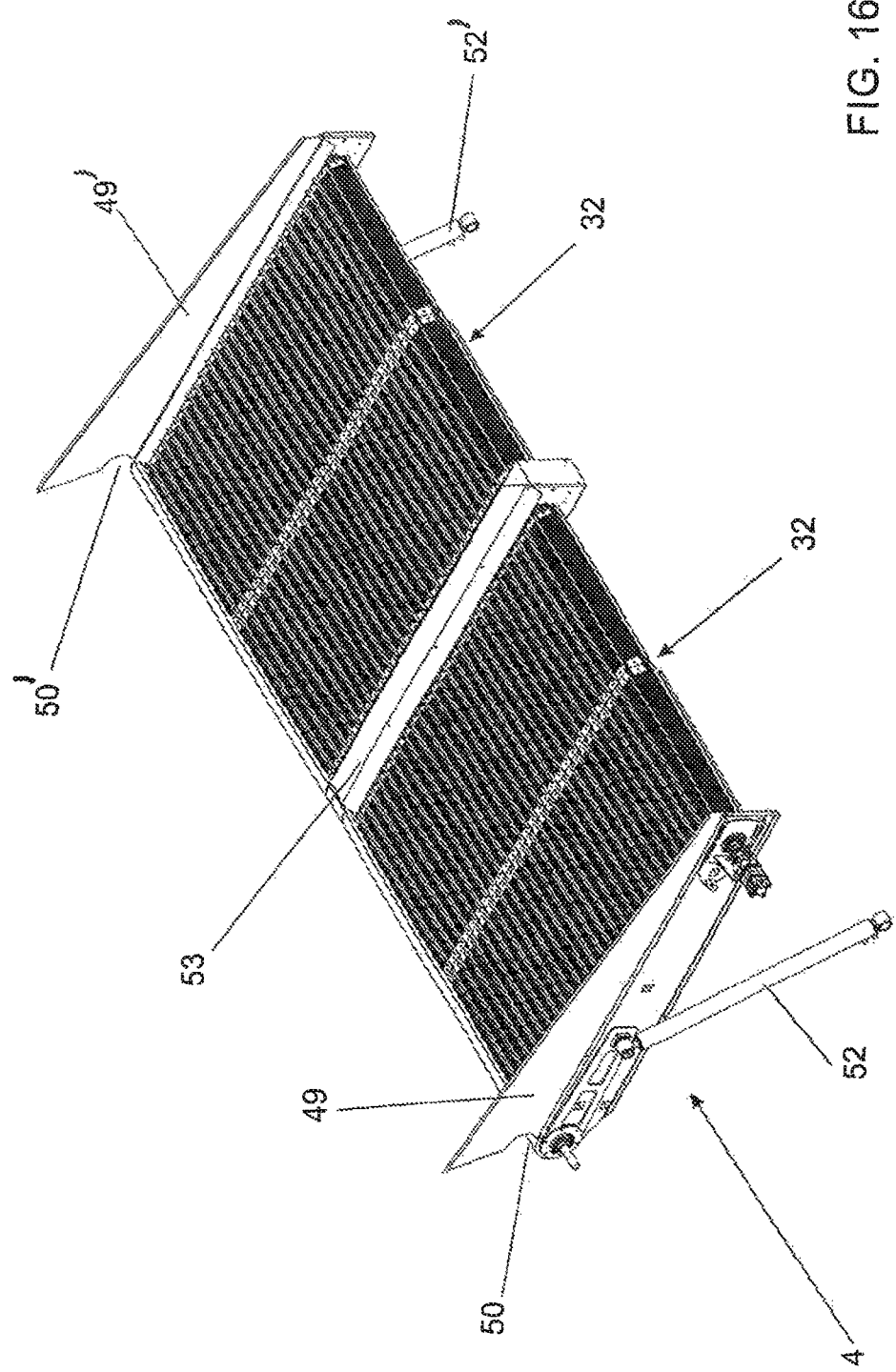
FIG. 16 shows a magnified perspective view the transshipment belt alone.

In FIG. 16 is shown the unloading and cleaning transshipment belt (4), the belt being comprised of front and rear modules (32) and (32') assembled side by side. This allows for excellent flexibility of assembly for belts with different measurements, since the modules can be formed as desired and adapted to the measurements of the dumper.

In FIGS. 17 to 21 the modules of the transshipment belt (32) and (32') are shown in detail, illustrating how the modules form a grid structure having a front side plate (33) and rear side plate (33') interconnected by various crosswise bars (34), with lengthwise bars serving both as rails (35) and as fixing points for plate sieves (36), which are fixed to the lower side of the structure. An end crosspiece made of a semicircular curved plate (37) combines with the front and rear side plates (33) and (33') to hold corresponding front right and front left side support bearings (38) and (39) located on the opposing edges of the front side plate (33), and rear right and rear left side support bearings (38') and (39') located on the opposing edges of the rear side plate (33'), for the rotating position of a motor axis (40) and a moving axis (41).

The motor axis (40) is coupled to a hydraulic motor (42), with gears (43) and guides (44) distributed along both axes (40) and (41). The guides (44) receive the belt as seen in detail in FIGS. 17, 18, and 19.

The belt is formed by chains (45) which, on their internal side, are coupled to the gears (43) and, on their external side, distribute a plurality of extensions (46), which serve as fixing points for the edges of various strips of plates forming transporting sieves (47), whose lengthwise edges are folded to opposite sides in two different angles, forming flaps turned inside and outside (48), between which the product is clamped, sieved and moved.

The upper edge of each of the front and rear side plates (33) and (33') receives protection and a guide in the form of a corresponding front and rear extended triangular plate (49) and (49'), respectively. The front extended triangular plate (49) has one higher end with a front semicircular carved portion (50), that fits and adjusts the one end of the tubular finishing piece (26) of the dumper (3) when the transshipment belt (4) is in its unloading position, allowing it to guide the moving product material to flow over the belt (4). Fitting and adjusting in an identical manner as described above to the opposite end of the tubular finishing piece (26), the rear extended triangular plate (49') also has one higher end with a rear semicircular carved portion (50').

The moving axis of each module (32) and (32') has its front edge (51) and rear edge (51') (not shown) sufficiently exposed to be supported on the corresponding bearings (23) and (23') of the complementary structure (2), where it can move from a vertical resting position to a horizontal unloading position.

Side front and rear hydraulic cylinders (52) and (52') to power the movement of the module are hinged at one end to the corresponding front and rear side plates (33) and (33'), respectively, of the transshipment belt structure (4), with the opposite ends hinged to the corresponding parts of the complementary structure (2). Additionally, the side hydraulic cylinders (52) and (52') are also interconnected by hoses coming from the tractor, where both are conveniently controlled.

Figure 17:
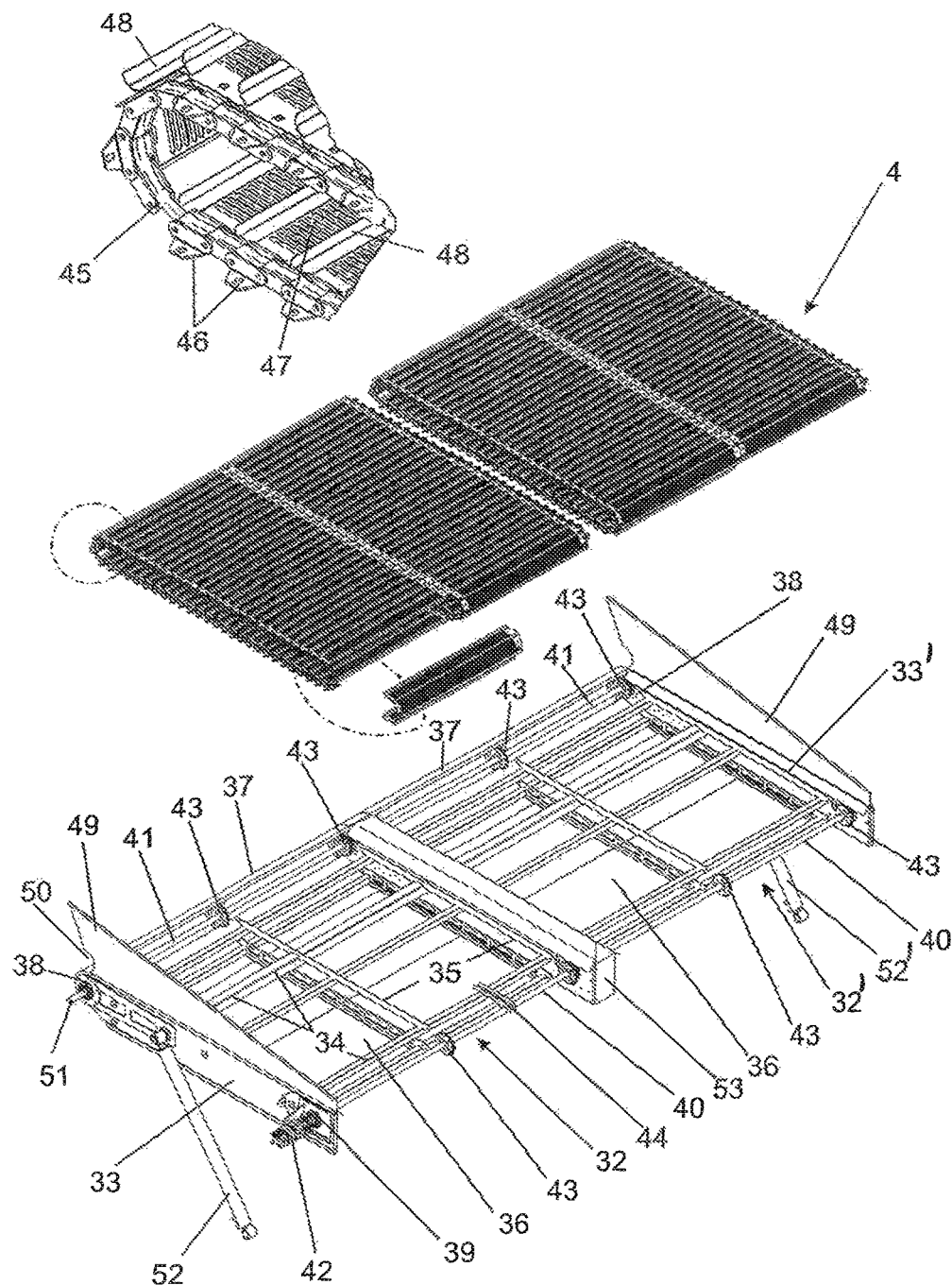
FIG. 17 shows a partially exploded perspective view highlighting the structure of the transshipment belt, including a magnified detail view illustrating the parts of the belt that are interconnected by chains.
Figure 18:
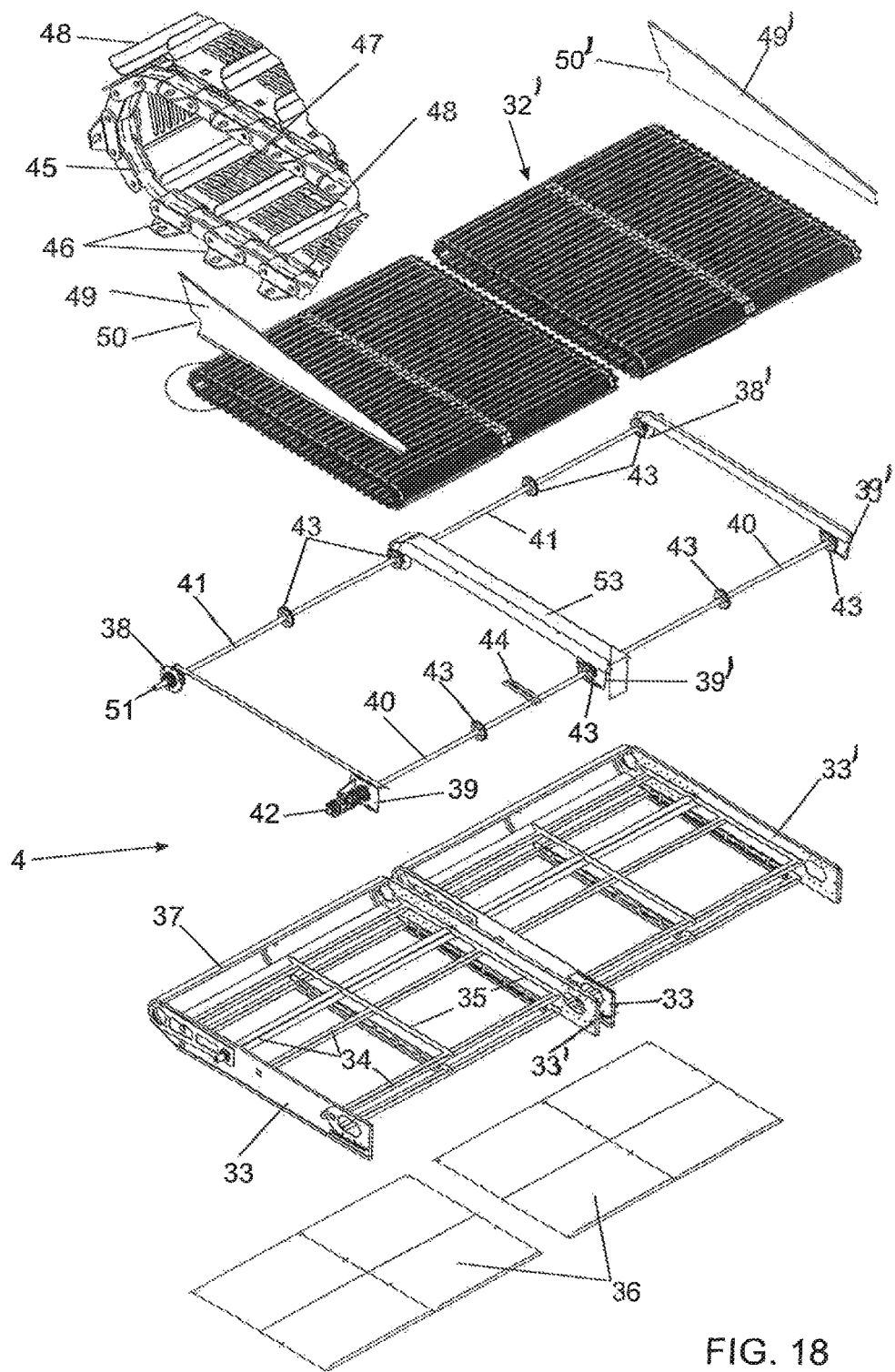
FIG. 18 shows an exploded perspective view of the transshipment belt and its magnified details.
Figure 19:
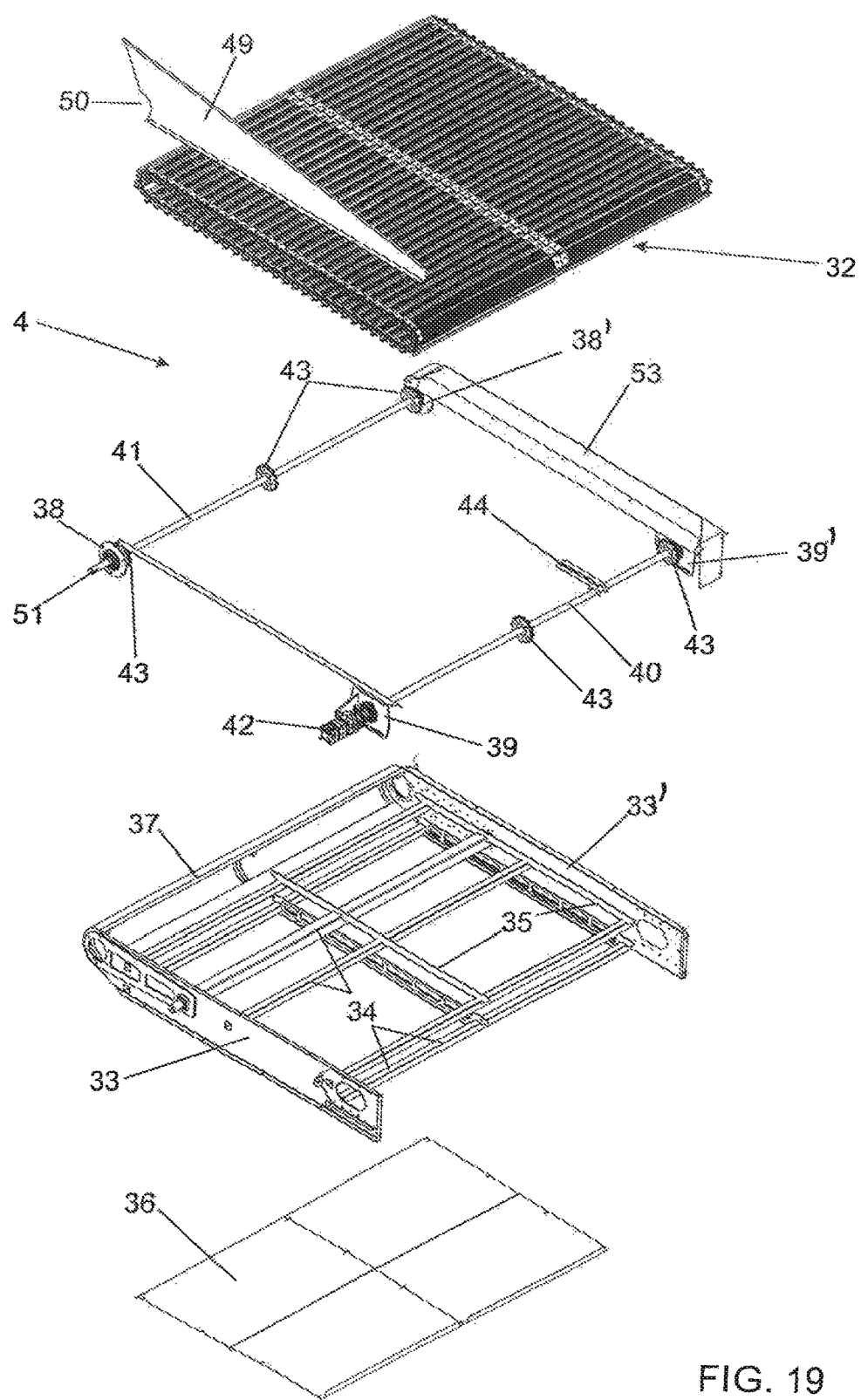
FIG. 19 shows an exploded perspective view of the transshipment belt, highlighting the magnified parts of one of the modules forming the belt.
Figure 20:
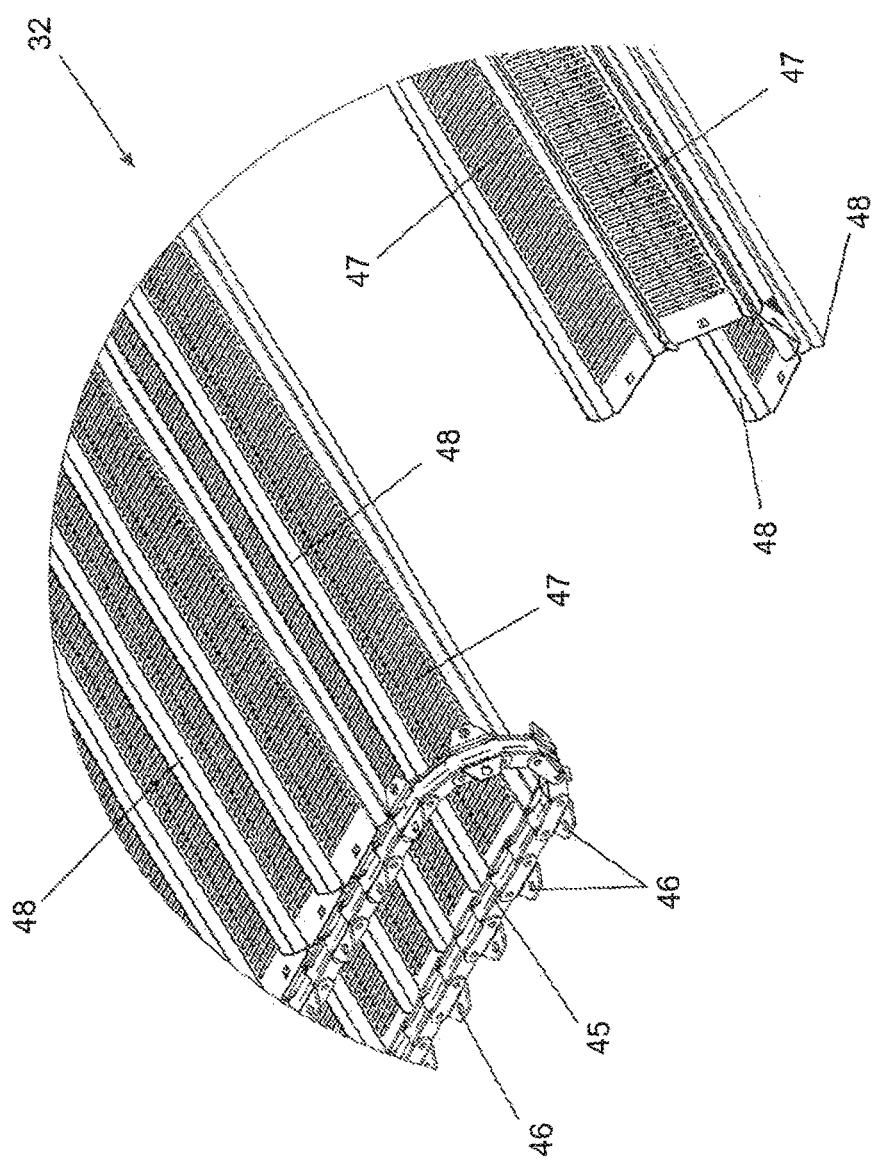
FIG. 20 shows a magnified perspective detail of the transshipment belt.
Figure 21:
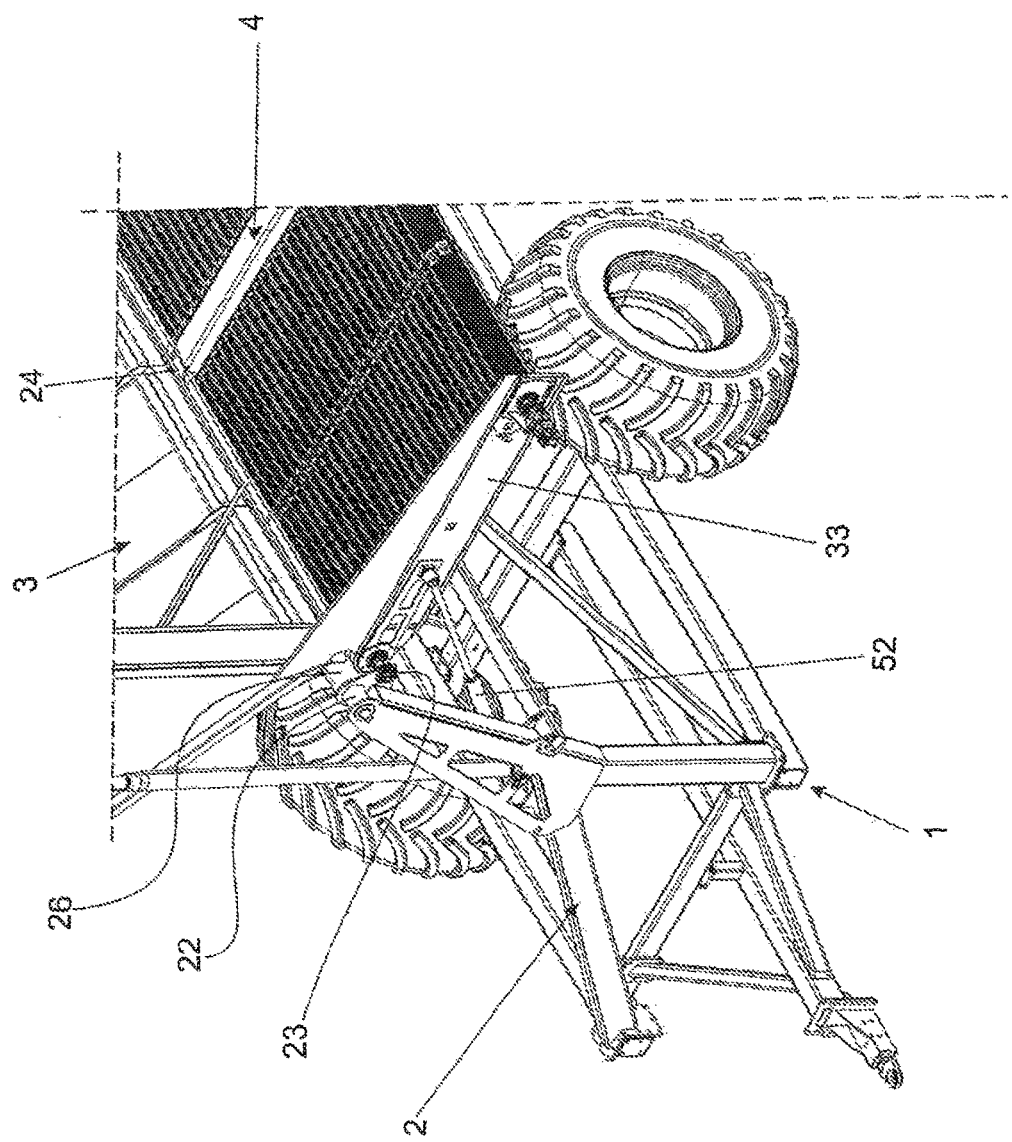
FIG. 21 shows a magnified perspective detail of the front region of the transshipment implement.

FIGS. 17 and 18 illustrate a transshipment belt (4) of a modular type, showing that when modules are connected side by side, some constituents simply cross the sides (33) and (33'), such as the axes (40) and (41), being duly supported, and, in this interconnection of the modules (32) and (32') of the belt (4) side by side, a finishing cover (53) is also included.

As explained and illustrated above, the present invention presents a wide range of potential embodiments and functional details which support its use with different crops, most notably peanuts, embodying all those advantages as previously mentioned, since the cart (1) is compact, its chassis simply defined by two longitudinal beams (5-5') and crosspieces (6-7). The chassis includes the means for two different positions over an axle with two wheels, thus allowing one to choose the desired center of gravity, so as to allow the engaging lance (12) to be assembled at any one of the edges of the chassis, which allows one to select unloading by the left or the right side of the cart.

The dumper (3) has a hydraulic cylinder system (28-28') activated by the hydraulic pump of an attached tractor. As previously stated, the dumper is able to tilt to the right or left side, and its unloading side is substantially higher, with a flowing edge combined to a transshipment belt (4), also having a side hydraulic cylinder-activated system (52-52') and hydraulic motor (42) activated by the pump of a given tractor.

The transshipment belt (4) has two hydraulic systems, the first a set of side hydraulic cylinders (52-52') for its movement at an angle, allowing the belt it to be put into different angled positions ranging from a vertical position to a horizontal position. This allows the transshipment belt to be kept retracted as in FIG. 1 while loading the implement, or to be deployed or in an unloading horizontal position as in FIG. 3.

In the unloading horizontal position, as shown by FIG. 15, the transshipment belt (4) forms a bridge between the dumper (3) and the product receptacle (L), e.g. the compartment of another, larger transportation vehicle. The transshipment belt has been developed to speed up the process of product unloading and, concomitantly, to perform a cleaning function, working as a sieve to take off particles (T), such as earth, which drop directly to the ground, as also shown in FIG. 15.

The transshipment belt has been designed with embodiment details allowing for the uniform distribution of the products while unloading into another receptacle or compartment. The dumper (3) and its hydraulic system have been developed with details allowing the acceleration of unloading, i.e., after positioning the belt (4) next to the receptacle for the product, the dumper (3) is gently and gradually tilted, so that the product material can flow over the belt (4) uniformly and in a controlled manner, during which time the bridge as defined by the belt (4) allows smaller particles, such as earth, to drop into the gap between the dumper (3) and the receptacle (L) for the unloaded product.

The invention claimed is:

1. A transshipment implement for agricultural products, comprising:
   a wheeled cart, constructed and arranged to be connected to and towed by a tractor having a hydraulic pump;
   a complementary structure, assembled above the cart, and constructed and arranged to provide hinging supports for an attachment of a transshipment dumper and a cleaning and unloading transshipment belt to the cart;
   the transshipment dumper, having one lower side wall, one higher side wall, one front wall, and one rear wall, with the dumper supported above the cart, wherein the higher side wall of the dumper is slightly tilted outwards and is substantially higher than the lower side wall on the opposing side of the dumper, with the lower side wall being vertical, and wherein the higher side wall of the dumper is hinged at its tips to corresponding points of the complementary structure supporting the dumper, enabling the dumper to tilt according to an angle which is greater than 90°, and wherein atop the front and rear walls are assembled hydraulic cylinders interconnected by hoses to the hydraulic pump circuit of the tractor, wherein activation of the hydraulic cylinders allows the dumper to tilt; and
   said cleaning and unloading transshipment belt with one end hinged in alignment to a corresponding edge of the higher side wall of the dumper, constructed and arranged to be moved from a vertical position to a horizontal position, wherein the vertical position constitutes a retracted position where the transshipment belt remains attached to the higher side wall of the dumper, and the horizontal position constitutes an unloading position, and wherein during unloading a sieving and cleaning function is performed whereby unwanted particles of a larger size than the product material being moved are sieved through the belt.

2. The transshipment implement of claim 1, wherein the wheeled cart further comprising a simple chassis defined by:
   a left side longitudinal beam and a right side longitudinal beam, each having respective ends; the left side longitudinal beam and right side longitudinal beam being connected at the ends by a front crosspiece and a rear crosspiece;
   an axle attached to and between the longitudinal beams attached to a left wheel and a right wheel;
   a third middle longitudinal beam with an end edge fixed over the middle of the axle and a front edge fixed to the middle part of the front crosspiece, wherein adjacent to the front crosspiece the front edge forms an edge with left and right assembling reinforcements for an attached engaging and towing lance, and wherein a left front support, and a right front support, a left rear support, and a right rear support are included over the left and right side longitudinal beams to attach to corresponding parts of the complementary structure; and
   wherein the chassis is constructed and arranged for two different positions over the axle to enable selection of a desired center of gravity and for the towing and engaging lance to be assembled at any edge of the chassis and wherein unloading may be performed on the left or right hand side of the cart.

3. The transshipment implement of claim 1, wherein the complementary structure assembled above the cart further comprising:
   four legs, including a front vertical leg, a rear vertical leg, a front inclined leg and a rear inclined leg, wherein the front inclined leg has a front foot attached at an angle on a lower end, and the rear inclined leg has a rear foot attached at an angle on a lower end for fixation to the cart, and the front vertical leg has a front foot attached at a lower end and the rear vertical leg has a rear foot attached at a lower end for fixation to the cart;
   a pair of triangular plates, wherein each vertical leg is joined with a corresponding inclined leg at an upper end by a triangular plate of said triangular plates; and
   an outwardly tilted grid assembled between the two triangular plates, wherein the grid on a lower end contains a front strut and a rear strut and on an upper part has a front plate and a rear plate, wherein a front hinging support shaft and front bearing and a rear hinging support shaft and rear bearing are located at a front end and a rear end of the grid;
   wherein jointly with a central middle bearing, the bearings and support shafts form hinging supports for the dumper and the unloading and cleaning transshipment belt.

4. The transshipment implement of claim 1, wherein the dumper further comprising:
   four walls, including said front wall, rear wall, higher side wall and lower side wall, wherein the higher side wall is outwardly tilted and the lower side wall is vertical, and wherein the higher and lower side walls are aligned lengthwise with a corresponding left side longitudinal beam and a right side longitudinal beam of the cart;
   a tubular finishing piece along an upper edge of the higher side wall with a front exposed edge section and a rear exposed edge section, fittable to a corresponding front hinging support shaft and a corresponding rear hinging support shaft of the complementary structure, wherein the hinges constitute tilting points of the dumper;
   said hydraulic cylinders comprising a front hydraulic cylinder and a rear hydraulic cylinder assembled over the corresponding front wall and rear wall of the dumper, wherein the front hydraulic cylinder has a corresponding front hinged edge over a front vertical riser of the lower side wall and an opposite end is equally coupled at a front hinge point assembled between a corresponding front triangular plate of the complementary structure, and the rear hydraulic cylinder has a corresponding rear hinged edge over a rear vertical riser of the lower side wall and an opposite end is equally coupled at a rear hinge point assembled between a corresponding front triangular plate of the complementary structure, and wherein the hydraulic cylinders are also interconnected by hoses in the hydraulic pump circuit of the tractor; and
   wherein the activation of the hydraulic cylinders allows the dumper to tilt by tilting around the corresponding exposed edge sections supported by the hinging support shafts of the complementary structure.

5. The transshipment implement of claim 1, wherein the unloading and cleaning transshipment belt is hinged in alignment with a hinging edge of the dumper and further comprising:
   interconnected transshipment belt modules assembled side by side, each module constructed and arranged in a grid defined by; two side plates interconnected by multiple crosswise and other lengthwise bars working as rails, wherein the bars also constitute fixing points for transporting plate sieves to be fixed to a lower side of the modules, wherein the modules also contain a semicircular curved end crosspiece plate combining with the side plates to lodge support bearings for a rotating support of a motor axis and a moving axis;
   a motor axis with an edge coupled to a hydraulic motor, and a moving axis, wherein both the motor axis and the moving axis have multiple gears and guides distributed along their length, and wherein the guides receive a belt; wherein the belt is formed by chains which on an internal side are coupled to the gears and on an external side contain multiple extensions, wherein the extensions constitute fixing points for ends of plate strips to form the transporting plate sieves, and wherein lengthwise edges of the plate strips are folded, forming flaps towards inside and outside, through which gutters for receiving, sieving and moving product grain are formed;
   an elongated triangle plate covering an upper edge of the side plates and guiding the side plates, with one higher end of the triangle plate containing a semicircular carved part adjustable to a tubular piece of the dumper when the transshipment belt is in an unloading position; and
   wherein the motor axis of each transshipment belt module has exposed edges able to be supported by bearings of the complementary structure, enabling the belt to be moved in an angle from a vertical resting position to a horizontal unloading position, and having side hydraulic cylinders hinged at an edge to the side plates of the belt and an opposing edge hinged to the complementary structure, and wherein the cylinders are also interconnected to hoses of the tractor, and over the interconnected transshipment belt modules of the belt rests a finishing cover.

* * * * *